Patented Oct. 4, 1932

1,880,901

UNITED STATES PATENT OFFICE

OTTO DROSSBACH, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

PRODUCTION OF MALEIC ACID AND ITS ANHYDRIDE

No Drawing. Application filed September 12, 1931, Serial No. 562,605, and in Germany September 24, 1930.

The present invention relates to improvements in the production of maleic acid and its anhydride.

I have found that maleic acid and its anhydride are obtained readily and in good yields by bringing a crotonic substance corresponding to the formula $$CH_3-CH=CH-CH-X,$$

in which X is either -COOH or -COH, i. e. crotonaldehyde or crotonic acid, or a mixture of both, in the vapor phase together with oxygen, or gases containing oxygen, into contact with catalysts consisting of or essentially containing at least one of the oxides of vanadium and molybdenum at temperatures between about 200° and about 500° C. preferably between 250° and 380° C. The reaction commences at rather low temperatures; for example even at a temperature as low as 250° C. maleic acid is obtained in good yields. Theoretically 1 molecular proportion of crotonaldehyde requires at least 2 molecular proportions of oxygen, an equimolecular proportion thereof being theoretically sufficient for oxidizing crotonic acid; the best results are, however, obtained when employing oxygen in a large excess over the quantity theoretically required; the oxygen may be diluted with inert gases, such as nitrogen or carbon dioxide. Since air is cheaper than pure oxygen, I prefer to employ air, and I employ, generally, about 1 cubic meter of air for from about 20 to 56 grams, preferably about 20 grams, of crotonic acid or crotonaldehyde. An amount from about 56 grams to about 480 grams of crotonaldehyde for 1 cubic meter of air is preferably not employed in order to avoid explosions; if however, a quantity of crotonaldehyde within the said range be employed, explosions may still be avoided by working at a decreased pressure and at a correspondingly lower temperature. The addition of carbon dioxide to the gaseous mixture may also reduce the risk of explosions. A special advantage, inter alia, of the process according to the present invention is that very pure maleic acid free from injurious by-products is obtained. Instead of crotonaldehyde, acetaldol, which when heated to about 84° to 85° C. is readily converted into crotonaldehyde, may be directly employed.

As already stated, the catalysts consist of, or essentially contain, at least one oxide of the metals vanadium and molybdenum. The oxides may be employed as such but usually mixed with solid diluents in order to save catalytical material. These solid diluents may act as inert carriers, and/or as activators; also mixtures of the different kinds of solid diluents may be employed. Solid, inert diluents are for instances compact metals, for example granules of metallic aluminium. The diluents which may act as activators are for example metal compounds difficultly reducible by hydrogen to the corresponding metals, as for example metal oxides such as titanic oxide and hydrated titanic oxide, tungstic oxide and its hydrate, silica or alumina. Since these difficultly reducible oxides act as activators, a very small amount of vanadium or molybdenum oxide is required, if such diluents be employed. In addition to the vanadium and/or molybdenum oxides, or to the mixtures of these oxides with the said diluents, small amounts of other base metal oxides may also be present in the catalysts such as for example zinc oxide, cerium oxide, chromium oxide, cobalt oxide, lead oxide, zirconium oxide, tin oxide, potassium oxide, sodium oxide, lithium oxide, rubidium oxide, calcium oxide, barium oxide, strontium oxide, magnesium oxide and the other base metal oxides. The said oxides may also be present in the catalysts in the form of their salts with those oxides which are of acidic nature; thus for example alkali metal or alkaline earth metal vanadates or molybdates may be employed as the catalysts and alkali metal or alkaline earth metal tungstates or silicates may be present therein. Also natural silicates, such as pumice or kieselguhr, may be employed as diluents for catalysts, the small amount of metallic impurities, such as calcium, magnesium, barium or strontium oxides, contained therein, acting as activator in many cases.

Especially active catalysts are obtained by employing the lower oxides of vanadium or molybdenum ($V_2O_4$, $V_2O_3$ and $MoO_2$), as such or preferably together with titanic oxide; such catalysts may be prepared by heating to dryness aqueous dispersions of the oxides or of salts of the corresponding metals together with an aqueous solution of oxalic acid. When porous diluents, such as pumice, are employed, the metal oxides may be directly fixed thereon in this way, for example by heating to dryness a mixture of granulated pumice and pulverized ammonium vanadate and titanic oxide, suspended in water.

The process may be carried out under atmospheric or any desired pressure.

The following examples will further illustrate the nature of this invention but the invention is not restricted to these examples.

Example 1

A current of air is led at a speed of 15 liters per hour through crotonaldehyde at a temperature of 30° C. combined with a second current of air having a velocity of 150 liters per hour and passed at 350° C. over a mixture of vanadium oxide and molybdenum oxide (from 10 parts of ammonium vanadate and 5 parts of molybdic acid), which is applied on to small pieces of aluminium of the size of peas. By cooling the reaction gases, very pure maleic anhydride is obtained in good yields.

When a mixture of crotonic acid vapors and air obtained by passing 200 liters of air per hour of crotonic acid heated to 90° C. is led at 320° C. over the same catalyst, maleic anhydride is likewise formed. If aldol be employed the evaporation is preferably carried out at from 80° to 90° C. and with a current of air having a velocity of from 5 to 10 liters only per hour and the vapor mixture is then mixed with further quantities of air.

Example 2

A current of air is passed at a velocity of 15 liters per hour through an 87 per cent crotonic aldehyde warmed to 30° C. The current of air laden with vapors of the aldehyde is combined with a second current of air having a velocity of 220 liters per hour and the whole gaseous mixture is then passed at 300° C. over a catalyst which has been prepared in the following manner: 20 grams of molybdic acid are suspended in 100 cubic centimeters of distilled water together with 8 grams of vanadic acid, 10 grams of titanium oxide and 10 grams of oxalic acid, 10 cubic centimeters of granulated pumice (having a diameter of the granules of about the size of peas) then being added and the whole evaporated to dryness while stirring. The gaseous mixture leaving the reaction chamber is cooled and washed with water, whereby from 105 to 110 parts of maleic acid are obtained from each 100 parts of crotonic aldehyde calculated as 100 per cent aldehyde, about 80 per cent of the acid being in the form of its anhydride.

Example 3

A current of air is led at a speed of 200 liters per hour through crotonaldehyde at a temperature of 0° C. The current of air laden with vapor of the aldehyde is passed at 400° C. over a catalyst consisting of an intimate mixture of kieselguhr, potassium sulphate and vanadic acid. The maleic acid contained in the mixture leaving the reaction chamber is obtained by cooling the mixture and washing with water.

Example 4

A current of air is passed at a velocity of 150 liters per hour through an 87 per cent crotonaldehyde cooled to 0° C. The gaseous mixture is then passed at 310° C. over a catalyst obtained by impregnating 100 cubic centimeters of granulated pumice (the granules of which have a diameter of about the size of peas) with a suspension of 20 grams of titanic oxide, 5 grams of ammonium molybdate and 3 grams of oxalic acid in 100 cubic centimeters of distilled water, and drying. The maleic acid contained in the gaseous mixture leaving the catalyst is obtained in a yield of 65 parts for each 100 parts of crotonic aldehyde calculated as 100 per cent aldehyde, by cooling and washing the mixture.

Example 5

A current of air is passed at a velocity of 200 liters per hour over fused crotonic acid at 90° C. The resulting mixture of air and vapors of crotonic acid is then contacted at 280° C. with a catalyst obtained by impregnating 100 cubic centimeters of granulated pumice (the granules of which have a diameter of about the size of peas) with a suspension of 11 grams of ammonium molybdate, 3.2 grams of vanadic acid, 4 parts of titanic anhydride and 4 grams of oxalic acid in 100 cubic centimeters of water, and drying. Crystals of pure maleic anhydride are obtained by cooling the gaseous mixture which has passed over the catalyst; in order to recuperate the whole of the maleic anhydride formed, the cooled gases are washed with water.

Example 6

A current of air is passed at a velocity of 2 liters per hour over acetaldol heated to 85° C. The resulting mixture of air with vapors of crotonaldehyde and water is dried by means of calcined sodium carbonate, combined with a second current of air having a velocity of 200 liters per hour and passed at 310° C. over the catalyst described in Example 2. The resulting maleic acid is obtained by washing with water the gaseous mixture leaving the reaction chamber and evaporating the aqueous solution.

What I claim is:—

1. The process for the production of maleic acid and maleic anhydride which comprises contacting vaporous non-explosive mixtures of oxygen and crotonic substances corresponding to the formula $CH_3-CH=CH-X$, wherein X is -COOH or -COH, with a catalyst essentially comprising at least one oxide of the metals vanadium and molybdenum at a temperature between about 200° and about 500° C.

2. The process for the production of maleic acid and maleic anhydride which comprises contacting vaporous non-explosive mixtures of air and crotonic substances corresponding to the formula $CH_3-CH=CH-X$, wherein X is COOH or -COH, with a catalyst essentially comprising at least one oxide of the metals vanadium and molybdenum at a temperature between about 200° and about 500° C.

3. The process for the production of maleic acid and maleic anhydride which comprises contacting a vaporous mixture of 1 cubic meter of air and from about 20 to about 56 grams of crotonic substances corresponding to the formula $CH_3-CH=CH-X$, wherein X is -COOH or -COH, with a catalyst essentially comprising at least one oxide of the metals vanadium and molybdenum at a temperature between about 200° and about 500° C.

4. The process for the production of maleic acid and maleic anhydride which comprises contacting vaporous non-explosive mixtures of oxygen and crotonic substances corresponding to the formula $CH_3-CH=CH-X$, wherein X is -COOH or -COH, with a catalyst essentially comprising vanadium oxide at a temperature between about 200° and about 500° C.

5. The process for the production of maleic acid and maleic anhydride which comprises contacting vaporous non-explosive mixtures of oxygen and crotonic substances corresponding to the formula $CH_3-CH=CH-X$, wherein X is -COOH or -COH, with a catalyst essentially comprising molybdenum oxide at a temperature between about 200° and about 500° C.

6. The process for the production of maleic acid and maleic anhydride which comprises contacting vaporous non-explosive mixtures of oxygen and crotonic substances corresponding to the formula $CH_3-CH=CH-X$, wherein X is -COOH or -COH, with a catalyst essentially comprising at least one oxide of the metals vanadium and molybdenum and a solid diluent at a temperature between about 200° and about 500° C.

7. The process for the production of maleic acid and maleic anhydride which comprises contacting vaporous non-explosive mixtures of oxygen and crotonic substances corresponding to the formula $CH_3-CH=CH-X$, wherein X is -COOH or -COH, with a catalyst essentially comprising at least one oxide of the metals vanadium and molybdenum deposited on granulated aluminium at a temperature between about 200° and about 500° C.

8. The process for the production of maleic acid and maleic anhydride which comprises contacting vaporous non-explosive mixtures of oxygen and crotonic substances corresponding to the formula $CH_3-CH=CH-X$, wherein X is -COOH or -COH, with a catalyst essentially comprising at least one oxide of the metals vanadium and molybdenum and a solid diluent comprising a metal compound, difficultly reducible by hydrogen to the corresponding metal, at a temperature between about 200° and about 500° C.

9. The process for the production of maleic acid and maleic anhydride which comprises contacting vaporous non-explosive mixtures of oxygen and crotonic substances corresponding to the formula $CH_3-CH=CH-X$, wherein X is -COOH or -COH, with a catalyst essentially comprising at least one oxide of the metals vanadium and molybdenum and a diluent of a metal oxide, difficultly reducible by hydrogen to the corresponding metal, at a temperature between about 200° and about 500° C.

10. The process for the production of maleic acid and maleic anhydride which comprises contacting vaporous non-explosive mixtures of oxygen and crotonic substances corresponding to the formula $$CH_3-CH=CH-X,$$

wherein X is -COOH or -COH, with a catalyst essentially comprising at least one oxide of the metals vanadium and molybdenum and titanium oxide, at a temperature between about 200° and about 500° C.

11. The process for the production of maleic acid and maleic anhydride which comprises contacting vaporous non-explosive mixtures of oxygen and crotonic substances corresponding to the formula $$CH_3-CH=CH-X,$$

wherein X is -COOH or -COH, with a catalyst, essentially comprising at least one oxide of the metals vanadium and molybdenum and alumina, at a temperature between about 200° and about 500° C.

12. The process for the production of maleic acid and maleic anhydride which comprises contacting vaporous mixtures of oxygen with substances corresponding to the formula $CH_3-CH=CH-X$, wherein X is -COOH or -COH, with a catalyst essentially comprising a lower oxide of the metals vanadium and molybdenum and a titanium oxide at a temperature between about 200° and about 500° C.

13. The process for the production of maleic acid and maleic anhydride which comprises contacting vaporous mixtures of oxygen and crotonic acid with a catalyst essentially comprising at least one oxide of the metals vanadium and molybdenum at a temperature between about 250° and about 380° C.

14. The process for the production of maleic acid and maleic anhydride which comprises contacting vaporous non-explosive mixtures of oxygen and crotonaldehyde with a catalyst essentially comprising at least one oxide of the metals vanadium and molybdenum at a temperature between about 250° and about 380° C.

15. The process for the production of maleic acid and maleic anhydride which comprises contacting vaporous non-explosive mixtures of oxygen and crontonaldehyde with a catalyst comprising at least one oxide of the metals vanadium and molybdenum and titanium oxide and pumice between about 250° and 380° C.

16. The process for the production of maleic acid and maleic anhydride which comprises contacting vaporous mixtures of oxygen and crotonic acid with a catalyst comprising molybdic oxide, vanadic oxide, titanium oxide and pumice at about 280° C.

In testimony whereof I have hereunto set my hand.

OTTO DROSSBACH.